(12) United States Patent
Timem et al.

(10) Patent No.: US 9,215,321 B2
(45) Date of Patent: Dec. 15, 2015

(54) UTILIZING VOICE BIOMETRICS

(71) Applicant: Bank of America Corporation, Charlotte, NC (US)

(72) Inventors: Joseph Timem, Fair Lawn, NJ (US); Donald Perry, Charlotte, NC (US); Jenny Rosenberger, Newark, DE (US); David Karpey, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/922,855

(22) Filed: Jun. 20, 2013

(65) Prior Publication Data

US 2014/0376703 A1 Dec. 25, 2014

(51) Int. Cl.
*H04M 1/64* (2006.01)
*H04M 3/493* (2006.01)
*H04M 3/527* (2006.01)

(52) U.S. Cl.
CPC ............ *H04M 3/4936* (2013.01); *H04M 3/527* (2013.01); *H04M 2201/41* (2013.01); *H04M 2203/6054* (2013.01)

(58) Field of Classification Search
CPC ..................... H04M 3/42059; H04M 2201/40; H04M 2201/41; H04M 3/382; H04M 3/385; H04M 2203/6027; H04M 15/00; H04M 15/90; H04M 3/2281; H04M 1/6515; H04M 1/271; H04M 3/493; H04M 3/53325; H04M 1/663; G10L 17/26; G10L 17/00; G10L 17/22; G06F 21/32; B60R 16/0373; H04N 1/32704
USPC ............... 379/80, 88.01–88.04, 88.16, 88.18, 379/100.16, 142.05
See application file for complete search history.

(56) References Cited

U.S. PATENT DOCUMENTS

| 5,897,616 | A | 4/1999 | Kanevsky et al. | |
| 6,601,762 | B2 | 8/2003 | Piotrowski | |
| 7,136,458 | B1 * | 11/2006 | Zellner ................. | H04M 3/436 379/88.02 |
| 7,512,567 | B2 | 3/2009 | Bemmel et al. | |
| 7,686,211 | B2 | 3/2010 | Smith et al. | |
| 8,442,824 | B2 | 5/2013 | Aley-Raz et al. | |
| 8,605,885 | B1 | 12/2013 | Wooters | |
| 8,694,792 | B2 | 4/2014 | Whillock | |
| 2003/0233231 | A1 * | 12/2003 | Fellenstein et al. ........... 704/246 | |
| 2004/0022384 | A1 * | 2/2004 | Flores ..................... | H04M 3/38 379/265.13 |
| 2005/0243975 | A1 * | 11/2005 | Reich ..................... | H04L 12/66 379/88.01 |
| 2005/0273333 | A1 | 12/2005 | Morin et al. | |
| 2006/0116878 | A1 | 6/2006 | Nagamine | |
| 2007/0033041 | A1 | 2/2007 | Norton | |

(Continued)

OTHER PUBLICATIONS

International Search Report and Written Opinion mailed Nov. 13, 2014 in International Application No. PCT/US2014/043201.

(Continued)

*Primary Examiner* — Akelaw Teshale
(74) *Attorney, Agent, or Firm* — Banner & Witcoff, Ltd.; Michael A. Springs

(57) ABSTRACT

Methods, systems, computer-readable media, and apparatuses for handling calls based on a voice biometric confidence score are presented. In some embodiments, a computing device may receive a voice sample associated with a telephone call. Subsequently, the computing device may determine a voice biometric confidence score based on the voice sample. The computing device then may determine to route the telephone call to a certain endpoint based on the voice biometric confidence score.

15 Claims, 11 Drawing Sheets

(56) References Cited

U.S. PATENT DOCUMENTS

| | | | |
|---|---|---|---|
| 2007/0175986 A1* | 8/2007 | Petrone | G06F 21/32 235/382 |
| 2008/0312925 A1* | 12/2008 | Jaiswal et al. | 704/246 |
| 2010/0114776 A1 | 5/2010 | Weller et al. | |
| 2010/0329453 A1* | 12/2010 | Mehmood et al. | 380/44 |
| 2011/0202453 A1 | 8/2011 | Issa et al. | |
| 2011/0246196 A1* | 10/2011 | Bhaskaran | G10L 17/24 704/235 |
| 2011/0257975 A1 | 10/2011 | Novack et al. | |
| 2011/0260832 A1 | 10/2011 | Ross et al. | |
| 2012/0084078 A1 | 4/2012 | Moganti et al. | |
| 2012/0245941 A1 | 9/2012 | Cheyer | |
| 2012/0263285 A1 | 10/2012 | Rajakumar et al. | |
| 2012/0284026 A1 | 11/2012 | Cardillo et al. | |
| 2013/0132091 A1 | 5/2013 | Skerpac | |
| 2013/0159194 A1* | 6/2013 | Habib | 705/66 |
| 2013/0179692 A1 | 7/2013 | Tolba et al. | |
| 2013/0204430 A1 | 8/2013 | Davey et al. | |
| 2013/0204784 A1 | 8/2013 | Ogden | |
| 2013/0212640 A1 | 8/2013 | White et al. | |
| 2013/0212840 A1 | 8/2013 | Ahmadshahi | |
| 2013/0218758 A1 | 8/2013 | Koenigsbrueck et al. | |
| 2013/0218764 A1 | 8/2013 | Fujii | |
| 2013/0222133 A1 | 8/2013 | Schultz et al. | |
| 2013/0225128 A1 | 8/2013 | Gomar | |
| 2013/0226582 A1 | 8/2013 | Aley-Raz et al. | |
| 2013/0227651 A1 | 8/2013 | Schultz et al. | |
| 2013/0227666 A1 | 8/2013 | White et al. | |
| 2013/0232073 A1 | 9/2013 | Sheets et al. | |
| 2013/0238121 A1 | 9/2013 | Davey et al. | |
| 2013/0238905 A1 | 9/2013 | Dinha | |
| 2013/0251119 A1 | 9/2013 | Akolkar et al. | |
| 2013/0253919 A1 | 9/2013 | Gutierrez et al. | |
| 2013/0262873 A1 | 10/2013 | Read et al. | |
| 2013/0263233 A1 | 10/2013 | Dinha | |
| 2013/0263284 A1 | 10/2013 | Black et al. | |
| 2013/0267204 A1 | 10/2013 | Schultz et al. | |
| 2013/0272511 A1 | 10/2013 | Bouzid et al. | |
| 2013/0282637 A1 | 10/2013 | Costigan et al. | |
| 2013/0283201 A1 | 10/2013 | Costigan et al. | |
| 2013/0283378 A1 | 10/2013 | Costigan et al. | |
| 2013/0290136 A1 | 10/2013 | Sheets et al. | |

OTHER PUBLICATIONS

Rashid et al., "Security System Using Biometric Technology: Design and Implementation of Voice Recognition System (VRS)," IEEE, Proceedings of the International Conference on Computer and Communication Engineering 2008, May 13-15, 2008, Kuala Lumpur, Malaysia, 5 pages.

Non-Final Office Action dated Nov. 17, 2014 in U.S. Appl. No. 13/922,656.

Jan. 29, 2015 (WO)—PCT/US14/43215—International Search Report and Written Opinion.

Mar. 12, 2015 (WO) International Search Report and Written Opinion—App PCT/US2014/43174.

Apr. 21, 2015 (WO) International Search Report—App. PCT/US2015/043189.

* cited by examiner

UTILIZING VOICE BIOMETRICS

BACKGROUND

Aspects of the disclosure relate to computer hardware and software. In particular, one or more aspects of the disclosure generally relate to computer hardware and software for utilizing voice biometrics.

Large organizations, such as financial institutions, interact with and serve an ever-growing number of customers, who are often located all over the world. As such an organization's customer base continues to grow, it may become increasingly important to efficiently and accurately identify and authenticate customers across many different channels, not only to provide security and protect customer identity information, but also to build and improve upon relationships with customers. Some conventional ways of identifying and/or authenticating customers can, among other things, be tedious, inefficient, frustrating, and/or inaccurate, however, and as the customer base grows, the degree to which these issues can have an impact likewise increases.

SUMMARY

Aspects of the disclosure relate to various systems, methods, computer-readable media, and apparatuses that provide more convenient, efficient, accurate, and functional ways of identifying, authenticating, protecting, routing, and/or otherwise serving customers utilizing voice biometrics.

In some embodiments, authentication questions may be selected based on a voice biometric confidence score. For example, a computing device may receive a voice sample. Subsequently, the computing device may determine a voice biometric confidence score based on the voice sample. The computing device then may select one or more authentication questions based on the voice biometric confidence score.

In other embodiments, one or more calls may be handled based on a voice biometric confidence score. For example, a computing device may receive a voice sample associated with a telephone call. Subsequently, the computing device may determine a voice biometric confidence score based on the voice sample. The computing device then may determine to route the telephone call to a certain endpoint based on the voice biometric confidence score.

In still other embodiments, voice biometrics may be utilized to prevent unauthorized access. For example, a computing device may receive a voice sample. Subsequently, the computing device may determine a voice biometric confidence score based on the voice sample. The computing device then may evaluate the voice biometric confidence score in combination with one or more other factors to identify an attempt to access an account without authorization.

In yet other embodiments, voice biometrics may be utilized to provide relationship-based service. For example, a computing device may receive a voice sample associated with a customer of an organization. Subsequently, the computing device may determine a voice biometric confidence score based on the voice sample. The computing device then may determine a relationship between the customer and the organization based on the voice sample and the voice biometric confidence score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to utilizing voice biometrics. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
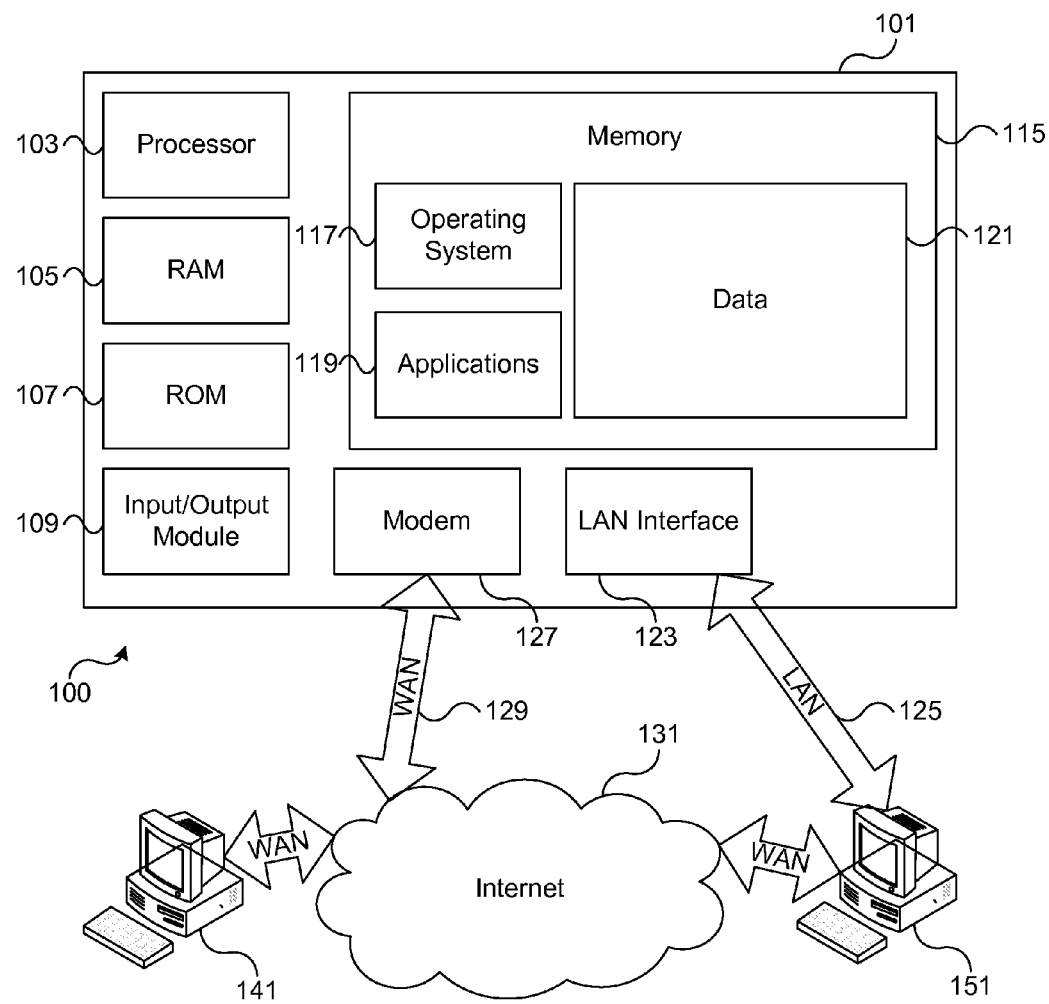
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
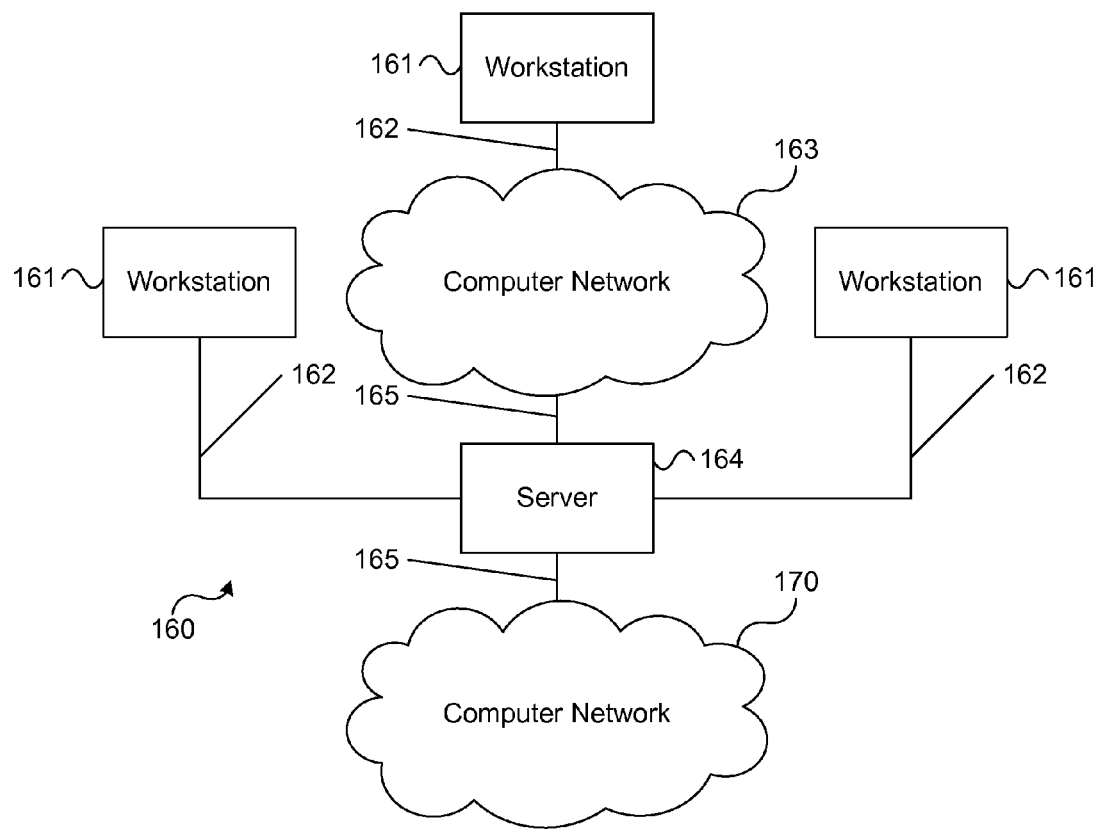
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

As introduced above, some aspects of the disclosure generally relate to utilizing voice biometrics. For instance, some aspects of the disclosure relate to utilizing voice biometrics in providing more convenient, efficient, accurate, and functional ways of identifying, authenticating, protecting, routing, and/or otherwise serving customers. In the discussion below, various examples illustrating how voice biometrics can be utilized in accordance with one or more embodiments will be discussed.

Generally, the term "voice biometrics" may refer to technologies and/or techniques that can be used to identify, and/or verify the identity of, a person. Such identification and/or verification may be performed by obtaining a sample of the person's voice and comparing the sample to a "voiceprint," which like a fingerprint, may be a unique or nearly unique identifier that is linked to a particular person. As discussed in several examples below, in comparing a voice sample to a voiceprint, a computing device may obtain a "confidence score," which may be a numerical value that is indicative of the degree to which the voice sample matches the voiceprint. For example, the closer the match between the voice sample and the voiceprint, the higher the confidence score may be.

In some instances, the voice sample that is compared to one or more voiceprints to obtain a confidence score may be obtained in different ways and/or from different sources. For example, such a voice sample may be obtained from one or more microphones installed at a physical location (such as a retail location, e.g., a banking center) during an in-person interaction (e.g., between a customer and a retail associate). Additionally or alternatively, such a voice sample may be obtained over the phone (e.g., during a conversation between a customer and a customer service representative, in response to a voice prompt provided by an interactive voice response (IVR) system, and/or the like). In other examples, a voice sample may be obtained over the internet (e.g., via a web interface) and/or from a software application (e.g., via a mobile application being executed on a customer's mobile device).

In addition, a voiceprint to which a voice sample can be compared may, in some instances, be obtained through an enrollment process. In some instances, an "active enrollment" process may be performed, while in other instances, a "passive enrollment" process may be performed. In an active enrollment process, a person, such as a customer of a financial institution or another organization or entity, may be prompted to speak certain phrases, and one or more computing device may record and analyze the sounds associated with the person speaking these phrases. Such an active enrollment process may, for instance, be performed in person (e.g., at a retail location, such as a banking center) and/or telephonically (e.g., over the phone with a customer service representative and/or using an IVR system). Additionally or alternatively, such an active enrollment process may, for instance, be performed online (e.g., over the internet using a microphone, camera, and/or webcam that may be communicatively coupled to a customer's smart phone, tablet computer, mobile device, and/or other computing device). In a passive enrollment process, instead of prompting a person, such as a customer, to speak certain phrases that can be recorded, a computing device may access, analyze, and/or otherwise use previously recorded calls and/or previously captured recordings of other conversations in which the person participated. These previously recorded calls may, for instance, be obtained from one or more telephonic systems, and the previously captured recordings may, for instance, be obtained from one or more recording and/or monitoring systems (which may, e.g., be deployed at one or more retail locations, such as one or more banking centers). Various techniques may be used to separate out a customer's voice (or other target person's voice) from a customer service representative's voice (e.g., in order to create a voiceprint for the customer or other target person). In addition, active enrollment and passive enrollment processes may be carried out on their own or in combination in order to build one or more databases of voiceprints that can subsequently be used in identified and/or authenticating customers. In some arrangements, even when passive enrollment processes are utilized, customers and/or other users who may use voice biometrics features may have to actively opt-in to a program to allow voiceprints to be created and/or have other voice biometrics features enabled. In other arrangements, customers and/or other users may be automatically enrolled in a voice biometrics program and instead may be provided with a choice to opt-out of the voice biometrics program.

By utilizing voice biometrics, particularly in accordance with the various embodiments discussed herein, numerous benefits may be provided to a large organization, such as a financial institution, or another entity (e.g., other corporate entity, government agency, university, and the like). For example, several embodiments discussed herein may provide faster, easier, and more efficient ways of securely identifying, authenticating, and/or otherwise verifying the identity of customers. In addition, several embodiments discussed herein may provide ways of reducing customer frustration. For instance, because the vast majority of callers and customers are legitimately presenting themselves when calling into an IVR system or visiting a retail location, and because several of the voice biometrics techniques discussed with respect to various embodiments can be used in frictionless and non-intrusive ways, various aspects of the disclosure may enable an organization, such as a financial institution, to more closely filter out actual attempts at unauthorized access and/or illegitimate usage of services, without interfering with legitimate customers who are using services in the proper and intended ways. Various embodiments that provide these and/or other benefits will now be discussed in greater detail in connection with the accompanying figures, beginning with FIG. 2.

Figure 2:
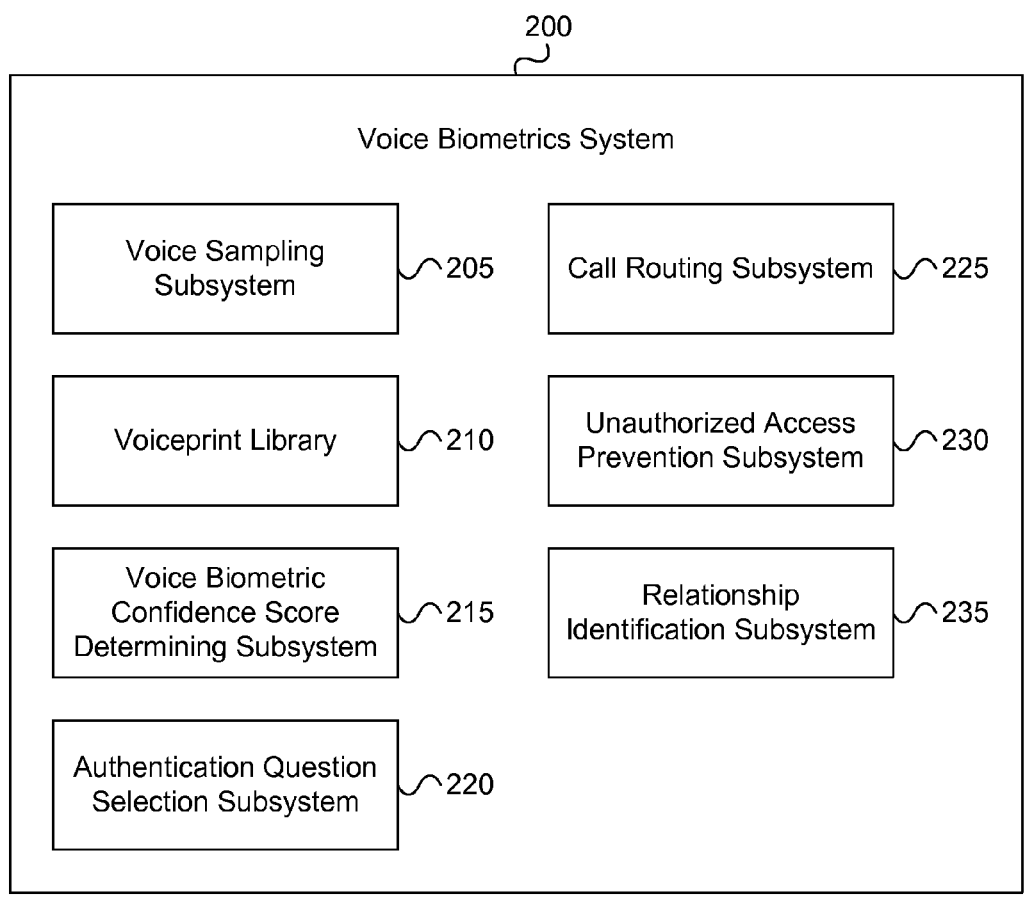
FIG. 2 illustrates an example of a voice biometrics system according to one or more embodiments.

FIG. 2 illustrates an example of a voice biometrics system 200 according to one or more embodiments. As seen in FIG. 2, system 200 may include one or more subsystems and/or other elements that each may be configured to provide different functionalities. In some embodiments, system 200 and the various subsystems and/or other elements included therein may be implemented in a single computing device. In other embodiments, system 200 may be implemented in one or more different and/or discrete computing devices which may, for example, be networked and/or otherwise connected to enable the various subsystems and/or other elements to exchange data with each other. For instance, in at least one embodiment, each element illustrated in system 200 may comprise and/or represent a separate computing device that is configured to provide various functions, such as those discussed below.

In some embodiments, system 200 may include a voice sampling subsystem 205. Voice sampling subsystem 205 may, for instance, be configured to receive one or more voice samples from various sources. For example, voice sampling subsystem 205 may receive voice samples from one or more microphones installed at one or more retail locations (which may, e.g., be stores, banking centers, kiosks, automated teller machine (ATM) alcoves, and/or the like). Additionally or alternatively, voice sampling subsystem 205 may receive voice samples from one or more telephone systems (e.g., one or more IVR systems), one or more internet and/or ecommerce systems, one or more mobile software applications and/or mobile devices, and/or other sources. In one or more embodiments, the voice samples received and/or otherwise collected by voice sampling subsystem 205 may include audio data that is associated with sound clips and/or other recordings of one or more utterances and/or other speech made by a person.

In some embodiments, system 200 further may include a voiceprint library 210. Voiceprint library 210 may, for instance, be configured to store, maintain, and/or access one or more databases that include voiceprints for one or more customers, account holders, other legitimate users, known illegitimate users, and/or other people. Each voiceprint may, for example, represent and/or include one or more previously recorded and/or previously analyzed voice samples that can be used when comparing and/or evaluating voice samples. In some embodiments, instead of or in addition to including previously recorded and/or previously analyzed voice samples associated with a particular person, a voiceprint may include characteristics and/or other data associated with one or more utterances made by the person. Such characteristics may, for example, be extracted and/or otherwise determined using various techniques, such as frequency estimation, hidden Markov models, pattern matching, other techniques, and/or the like.

In some embodiments, system 200 further may include a voice biometric confidence score determining subsystem 215. Voice biometric confidence score determining subsystem 215 may, for instance, be configured to compare one or more voice samples to one or more voiceprints. Additionally or alternatively, voice biometric confidence score determining subsystem 215 may, for instance, be configured to determine voice biometric confidence scores (e.g., based on the comparisons of the voice samples to the voiceprints). In one or more embodiments, a voice biometric confidence score may, for instance, be indicative of the degree to which a particular voice samples matches a particular voiceprint. In addition, such a voice biometric confidence score may be used in providing various functionalities in accordance with various aspects discussed below.

In some embodiments, system 200 further may include an authentication question selection subsystem 220. Authentication question selection subsystem 220 may, for instance, be configured to select one or more authentication questions to be used in authenticating and/or verifying a particular person. In one or more embodiments, the selection of such authentication questions may be based on a voice biometric confidence score, as discussed below.

In some embodiments, system 200 further may include a call routing subsystem 225. Call routing subsystem 225 may, for instance, be configured to route incoming and/or in-progress telephone calls to various endpoints based on a voice biometric confidence score, as discussed below. The endpoints to which calls may be routed by call routing subsystem 225 may, for example, include various IVR systems, non-specialized customer service representatives, specialized customer service representatives (who may, e.g., be specialized and/or trained in handling potentially illegitimate calls), and/or other systems and/or entities.

In some embodiments, system 200 further may include an unauthorized access prevention subsystem 230. Unauthorized access prevention subsystem 230 may, for instance, be configured to prevent unauthorized access to various systems and/or accounts. For example, unauthorized access prevention subsystem 230 may be used to secure accounts that can be accessed and/or transacted on in-person, over the phone, over the internet, via a mobile application, and/or in one or more other ways. In addition, unauthorized access prevention subsystem 230 may use one or more voice biometric confidence scores in combination with one or more other factors to identify attempts to access accounts without authorization, as discussed below.

In some embodiments, system 200 further may include a relationship identification subsystem 235. Relationship identification subsystem 235 may, for instance, be configured to determine a relationship between an organization (e.g., the organization that is using, operating, and/or deploying voice biometrics system 200) and a customer of the organization. In some instances, relationship identification subsystem 235 may determine such a relationship based on a voice sample (e.g., obtained from the customer) and/or a voice biometric confidence score (e.g., determined based on the voice sample and/or a voiceprint associated with the customer). For example, relationship identification subsystem 235 may allow for a customer of the organization to be identified based on their voiceprint, and subsequently approached in view of their relationship to the organization, rather than through the lens of a particular account or product that the customer may be calling in about, visiting a retail location about, and/or otherwise interacting with the organization about.

Figure 3:
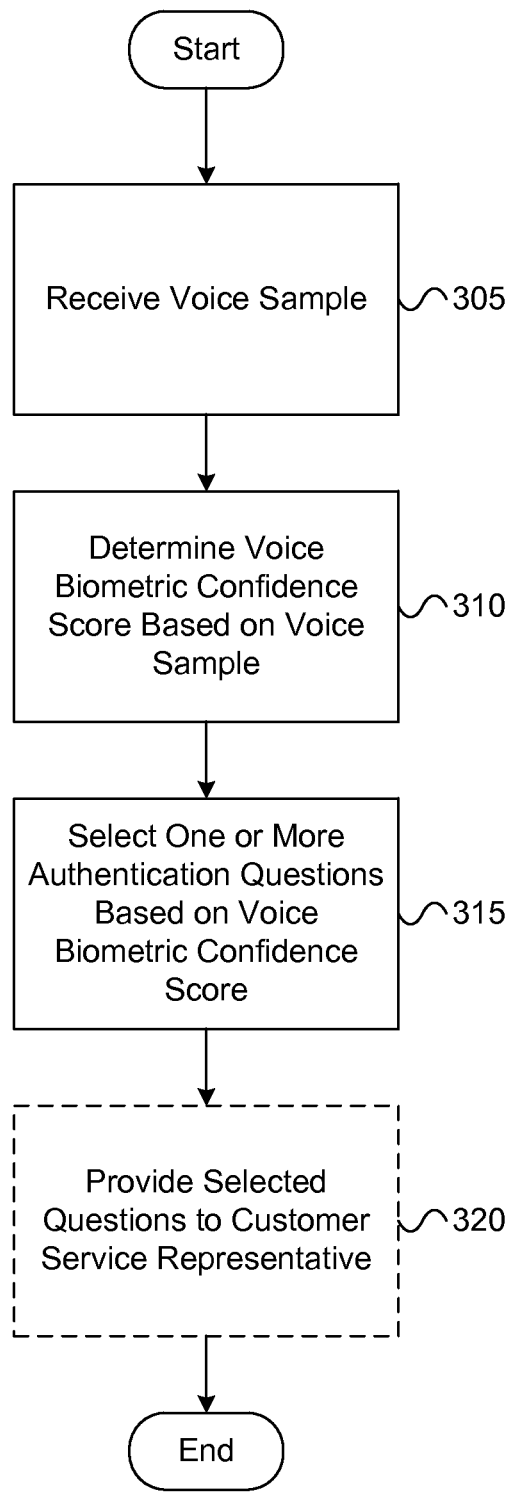
FIG. 3 illustrates a flowchart that depicts an example method of selecting authentication questions based on a voice biometric confidence score according to one or more embodiments.

FIG. 3 illustrates a flowchart that depicts an example method of selecting authentication questions based on a voice biometric confidence score according to one or more embodiments. In some embodiments, the method illustrated in FIG. 3 and/or one or more steps thereof may be performed by a computing device, such as computing device 101 or system 200. Additionally or alternatively, the method illustrated in FIG. 3 and/or one or more steps thereof may be embodied in computer-executable instructions that are stored in and/or configured to be stored in a computer-readable medium, such as a memory.

As seen in FIG. 3, the method may begin in step 305, in which a voice sample may be received. For example, in step 305, a computing device (e.g., computing device 101 or system 200) may receive a voice sample from one or more sources (e.g., from a telephonic system managing one or more telephone calls, from a monitoring system collecting audio information from one or more microphones, and/or other sources).

In step 310, a voice biometric confidence score may be determined based on the voice sample. For example, in step 310, the computing device may determine a voice biometric confidence score based on the voice sample received in step 305. In one or more arrangements, the computing device may determine the voice biometric confidence score by comparing the voice sample with one or more voiceprints (such as voiceprints stored in voiceprint library 210 of FIG. 2) using one or more analysis algorithms to quantify the degree to which the voice sample matches each of the one or more voiceprints.

Subsequently, in step 315, one or more authentication questions may be selected based on the voice biometric confidence score. For example, in step 315, the computing device may select one or more authentication questions from one or more predefined sets of authentication questions based on the voice biometric confidence score determined in step 310.

In one or more arrangements, each authentication question may be a question that can be asked to a caller, customer, or other user in order to determine and/or verify the identity of the caller, customer, or user. One or more authentication questions may, in some instances, be asked manually by a customer service representative (e.g., in person with the customer at a retail location, over the phone during a call with the customer, and/or via other forms of communication). In other instances, one or more authentication questions may be asked automatically by an IVR system, by an ATM machine, and/or by another computing device (e.g., over the phone during a call with the customer, in person while the customer is visiting a retail location, such as a banking center, and/or in other ways). In some instances, one or more authentication questions may be asked by a software application being executed on a mobile device. For example, such a software application may prompt a user to provide voice input (and/or other input) in response to each of the selected authentication questions, and the provided input may be checked and/or otherwise evaluated in determining and/or verifying the identity of the customer.

In one or more arrangements, the computing device may select a relatively larger number of authentication questions (e.g., five, six, seven, and so on) responsive to determining that the voice biometric confidence score is relatively low (which may, e.g., indicate that the voice sample does closely not match the voiceprint). Additionally or alternatively, the computing device may select a relatively smaller number of authentication questions (e.g., one, two, three, or four) responsive to determining that the voice biometric confidence score is relatively high (which may, e.g., indicate that the voice sample does closely match the voiceprint). In some instances, the computing device might determine not to select any authentication questions based on the voice biometric confidence score exceeding a predetermined threshold (which may, e.g., indicate that the voice sample substantially matches the voiceprint).

In step 320, the selected authentication questions may optionally be provided to a customer service representative. For example, in step 320, the computing device may provide the one or more selected authentication questions to a customer service representative for use in authenticating and/or otherwise verifying the identity of the customer, as discussed below. As discussed below, in additional and/or alternative embodiments, the computing device may, in step 320, directly provide the one or more selected authentications questions to the customer (e.g., instead of to a customer service representative). Such questions may, for instance, be directly provided to the customer telephonically via an IVR interface, electronically via a web interface and/or software application interface, and/or in one or more other ways.

In some embodiments, a voice sample may be received (e.g., in step 305) via a telephone call. For example, a voice sample may be captured over the phone during a caller's discussion with a customer service representative. Additionally or alternatively, a voice sample may be captured in response to and/or as a result of an IVR system prompting a caller to speak a certain phrase and/or otherwise provide voice input.

In some embodiments, a voice sample may be received (e.g., in step 305) via a microphone installed at a retail location. For example, a voice sample may be captured with one or more microphones installed at a retail location where a customer is physically present. Such a voice sample may, for instance, be captured during the customer's discussion with an employee or other associate at the retail location (e.g., a teller or greeter at a banking center). In other instances, such a voice sample may be captured during a customer's interaction with a computing device. For example, such a voice sample may be captured by an ATM machine (e.g., the ATM machine may prompt the customer to speak a certain phrase and/or otherwise provide voice input).

In some embodiments, a voice sample may be received (e.g., in step 305) via a mobile application (e.g., a software application that is executing on and/or configured to be executed on a mobile computing device). For example, a voice sample of a customer may be captured by a software application being executed on the customer's mobile device. In some instances, the software application may be a mobile banking application that may allow a customer to view account balances, deposit checks, transfer funds, and/or otherwise conduct transactions with respect to the customer's financial accounts.

In some embodiments, determining a voice biometric confidence score based on a voice sample (e.g., in step 310) may include comparing the voice sample to one or more voiceprints. For example, one or more voiceprints may be stored and/or maintained in one or more central databases, and the voiceprints may correspond to various customers of the organization. In some instances, after a voice sample is received, the one or more voiceprints included in the one or more central databases may be searched (e.g., based on the voice sample) and reduced to a subset of the most likely matches during a loose matching process. Such a process may, for instance, include identifying and comparing certain features of the voice sample to determined and/or previously established characteristics of the voiceprints (which may, e.g., have been previously determined during previous processing of the audio samples associated with the voiceprints). Once the most likely matches are determined, a closer matching process may be performed so as to determine which voiceprint most closely matches the voice sample. Subsequently, the closest matching voiceprint may be further analyzed and compared to the voice sample to determine a voice biometric confidence score. Additionally or alternatively, where a customer initially provides input to identify themselves (e.g., a user name, a telephone number, an account number, their first and/or last name, and/or other identifying information), a voiceprint that has been previously established for the customer may be selected and loaded from the one or more central databases and used in analyzing the voice sample. Such analysis of the voice sample may include employing various analysis techniques, such as frequency estimation, hidden Markov models, pattern matching, and/or other techniques. In addition, the voice biometric confidence score may reflect the degree to which the voice sample matches the closest voiceprint, as determined based on one or more of these and/or other analysis techniques.

In some embodiments, selecting one or more authentication questions based on the voice biometric confidence score (e.g., in step 315) may include selecting a certain number of questions based on the voice biometric confidence score. For example, a voice biometric confidence score that is at or above a first threshold may correspond to a first number of questions, a voice biometric confidence score that is at or above a second threshold less than the first threshold may correspond to a second number of questions (which may, e.g., be a greater number of questions than the first number of questions), and a voice biometric confidence score that is below the second threshold may correspond to a third number of questions (which may, e.g., be a greater number of questions that the second number of questions). Where the voice biometric confidence score is expressed in terms of a percentage (e.g., on a scale of 0 to 100, with a score of 100 representing an exact match), the first threshold may, for instance, be a score of 75, and the second threshold may, for instance, be a score of 45. In some instances, where the voice biometric confidence score is determined to be above a certain threshold (e.g., 95), the computing device may determine not to select any authentication questions. Rather, in these instances, the computing device may verify the customer or caller based solely on the voice sample (which may, e.g., provide the customer or caller with full access to transact on his or her account(s) as if he or she had been verified using one or more authentication questions). On the other hand, where the voice biometric confidence score is determined to be below a certain threshold, the computing device may determine to transfer the customer or the caller to a specialized customer service representative who may, e.g., specialize in handling potentially illegitimate calls, as discussed in greater detail below.

In some embodiments, selecting one or more authentication questions based on the voice biometric confidence score (e.g., in step 315) may include selecting one or more certain types of questions based on the voice biometric confidence score. For example, depending on the voice biometric confidence score (determined, e.g., by the computing device in step 310), the computing device may select questions with different levels of specificity and/or questions requiring different levels of knowledge. For instance, a voice biometric confidence score at or above a first threshold may correspond to a first set of type(s) of questions, a voice biometric confidence score at or above a second threshold less than the first threshold may correspond to a second set of type(s) of questions, and a voice biometric confidence score below the second threshold may correspond to a third set of type(s) of questions. If, for example, the voice biometric confidence score is relatively high, the one or more types of questions that are selected may be relatively easy to answer, such as the customer's birthdate, the customer's mother's maiden name, and/or the customer's billing address. If the voice biometric confidence score is moderately high, the one or more types of questions that are selected may be moderately easy to answer, such as the state in which the customer's account(s) were opened, the retail location or banking center that the customer has most recently visited, and/or the expiration date and/or verification value of the customer's credit card or debit card. If the voice biometric confidence score is relatively low, the one or more types of questions that are selected may be more intensive.

For example, if the voice biometric confidence score is relatively low, the authentication questions that are selected (e.g., by the computing device in step 315) may be questions that have answers that typically cannot be found online and/or through public records searches. Examples of these questions may include the name of a particular store or merchant that the customer visited and/or shopped with a certain number of times during a previous billing cycle, the last destination to which the customer traveled, the name of a club or group of which the customer is a member, and/or the maximum line of credit on the customer's credit card account.

In some embodiments, where one or more thresholds are used in selecting a certain number of authentication questions and/or certain types of authentications questions, such thresholds may be dynamically adjusted. For example, as a voice biometrics system (e.g., system 200) is used and various customers are authenticated and/or verified based on voice samples and voiceprints, the thresholds that are used in determining the number and/or types of authentication questions to be asked may be adjusted. For instance, these thresholds may be adjusted upwards and/or downwards based on metrics and/or statistics gathered about actual attempts at unauthorized access (e.g., with respect to all accounts maintained by a financial institution, with respect to certain accounts that are accessible via the voice biometrics system, and/or with respect to other accounts). For example, if certain accounts are targeted by attempts at unauthorized access more frequently than other accounts, customers and/or callers attempting to access these accounts may be presented with an increased number of authentication questions (e.g., by system 200 in step 315) than might otherwise be required for other accounts that have not been targeted as frequently.

As indicated above, after the one or more authentication questions are selected, the selected questions may, in some embodiments, be provided to a customer service representative. For example, the one or more selected questions may be sent (e.g., by the computing device in step 320) to a customer relationship management (CRM) application that may be used by a customer service representative who may be interacting with the customer (e.g., in person or on the phone). The provided questions may, for instance, be configured to cause the CRM application and/or the customer service representative to prompt the caller or customer to answer the authentication questions. In addition to providing the selected questions, the computing device also may provide the answers to the one or more selected questions. As the customer service representative prompts the caller or customer to answer the questions, the customer service representative may provide input indicating the customer's response and/or whether the customer's response was correct. Such input subsequently may be sent back to the computing device (e.g., system 200) and/or used by the CRM application to verify the customer and/or caller and enable access to the customer's accounts and/or other products (e.g., if the customer correctly answers a sufficient number of questions and can thus be considered verified).

Having discussed several examples of the processing that may be performed in selecting authentication questions based on a voice biometric confidence score in some embodiments, several user interfaces that may be displayed and/or otherwise provided will now be discussed in greater detail with respect to FIGS. 4 and 5. Any and/or all of the example user interfaces discussed herein may be displayed by a computing device, such as computing device 101 or system 200.

Figure 4:
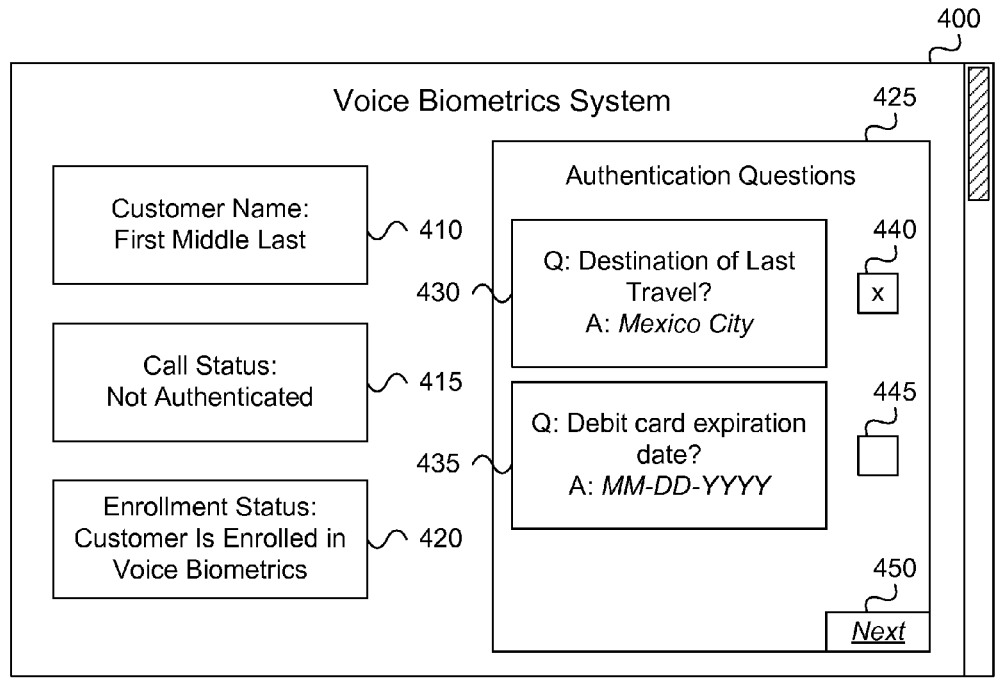
FIG. 4 illustrates an example user interface that may be displayed in providing one or more authentication questions to a customer service representative according to one or more embodiments.

FIG. 4 illustrates an example user interface 400 that may be displayed in providing one or more authentication questions to a customer service representative according to one or more embodiments. As seen in FIG. 4, user interface 400 may include one or more status indicators, such as a customer name indicator 410, a call status indicator 415, and an enrollment status indicator 420. Customer name indicator 410 may, for example, include the name of the customer or caller (e.g., if it has been previously obtained during the call or conversation or if it has been estimated based on voice biometrics). Call status indicator 415 may, for example, include information indicating whether the customer or caller has been authenticated and/or whether the identity of the customer or caller has been verified and/or otherwise confirmed based on voice biometrics. Enrollment status indicator 420 may, for example, include information indicating whether the customer or caller is enrolled in one or more voice biometrics programs.

In addition, user interface 400 may include a region 425 in which one or more authentication questions (such as the authentication questions selected, e.g., in step 315 of the example method discussed above) may be presented. For example, region 425 may include one or more question boxes, such as question boxes 430 and 435, and each question box may include an authentication question and a corresponding answer. Additionally, each question box may have corresponding answer boxes, such as answer box 440 (which, e.g., corresponds to question box 430) and answer box 445 (which, e.g., corresponds to question box 435). Each answer box may, for instance, be checked (or not) by a customer service representative or other user who may be interacting with user interface 400 based on whether the caller or customer correctly answers the question presented in the corresponding question box. Region 425 also may include a next button 450 that may, for instance, allow a user interacting with user interface 400 to view one or more additional authentication questions as part of an authentication and/or identity verification process.

Figure 5:
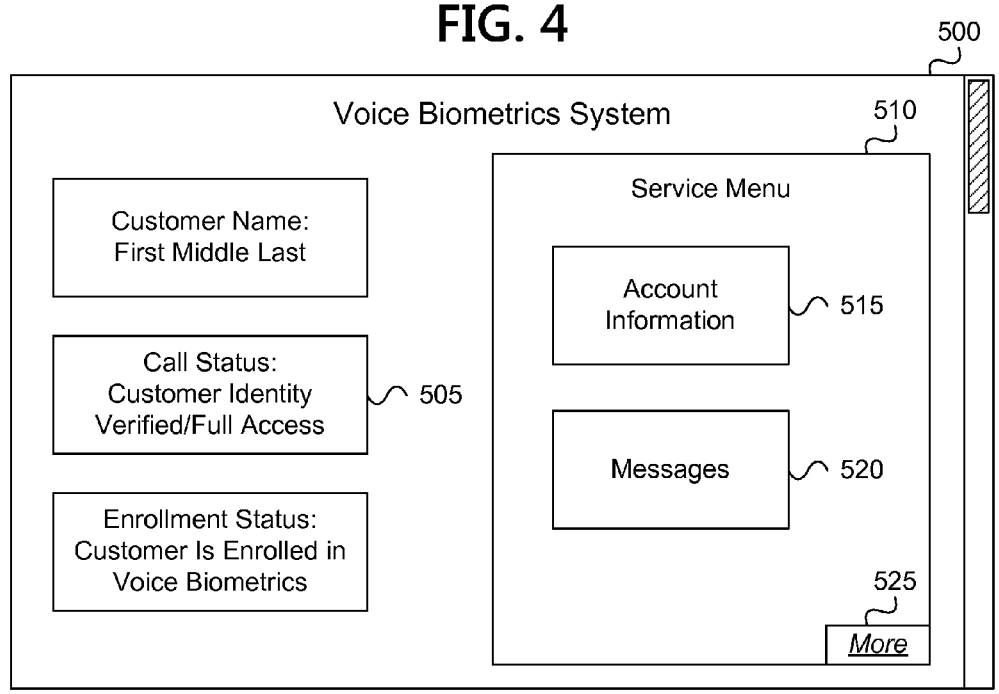
FIG. 5 illustrates an example user interface that may be displayed after a customer has been authenticated according to one or more embodiments.

FIG. 5 illustrates an example user interface 500 that may be displayed after a customer has been authenticated according to one or more embodiments. As seen in FIG. 5, user interface 500 may include an updated call status indicator 505 and a service menu 510. The updated call status indicator 505 may, for instance, indicate that the identity of the customer or caller has been verified and/or that the customer or caller has full access to transact on one or more accounts. The service menu 510 may, for instance, enable a customer service representative or other user who may be interacting with user interface 500 to access information about the customer or caller and/or otherwise serve the customer or caller. For example, service menu 510 may include one or more sections and/or links for providing particular functions to the customer or caller, such as an account information section 515 (which may, e.g., enable the customer service representative to view and/or edit customer account information) and a messages section 520 (which may, e.g., enable the customer service representative to view and/or edit one or more messages for the customer). In addition, service menu 510 may include a more button 525 that may allow a user interacting with the user interface 500 to view one or more additional screens (which may, e.g., include additional sections and/or links for providing other functions to the customer or caller).

Figure 6:
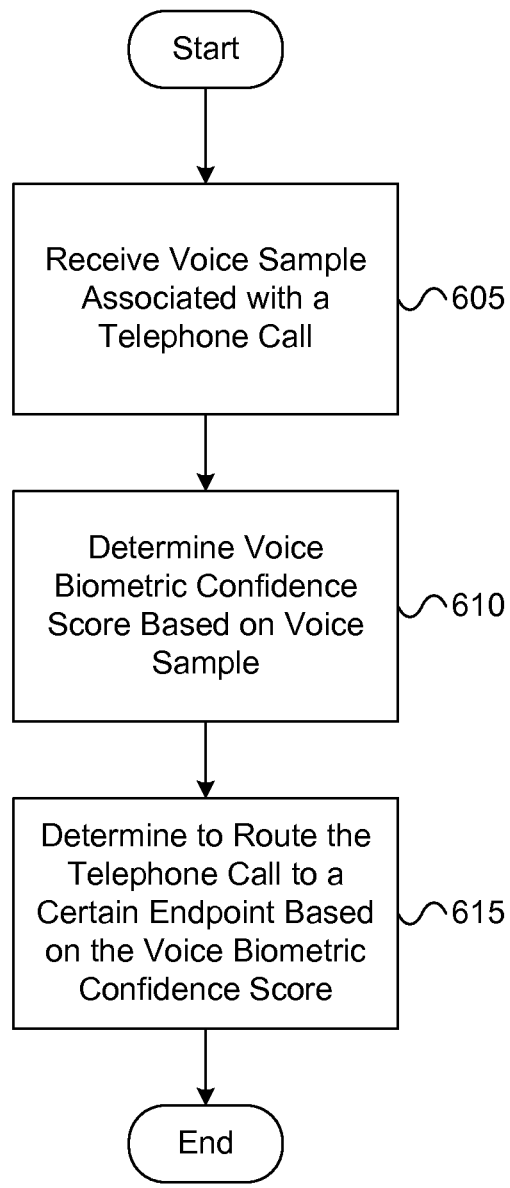
FIG. 6 illustrates a flowchart that depicts an example method of handling calls based on a voice biometric confidence score according to one or more embodiments.

FIG. 6 illustrates a flowchart that depicts an example method of handling calls based on a voice biometric confidence score according to one or more embodiments. In some embodiments, the method illustrated in FIG. 6 and/or one or more steps thereof may be performed by a computing device, such as computing device 101 or system 200. Additionally or alternatively, the method illustrated in FIG. 6 and/or one or more steps thereof may be embodied in computer-executable instructions that are stored in and/or configured to be stored in a computer-readable medium, such as a memory.

As seen in FIG. 6, the method may begin in step 605, in which a voice sample associated with a telephone call may be received. For example, in step 605, a computing device (e.g., computing device 101 or system 200) may receive a voice sample via a telephone call (e.g., from a telephonic system managing one or more telephone calls, including calls being handled by one or more IVR systems and calls being handled by one or more customer service representatives).

In step 610, a voice biometric confidence score may be determined based on the voice sample. For example, in step 610, the computing device may determine a voice biometric confidence score based on the voice sample received in step 605. Such a voice biometric confidence score may be determined based on the voice sample similar to how such a voice biometric confidence score may be determined in step 310 of the example method discussed above with respect to FIG. 3.

Continuing to refer to FIG. 6, in step 615, it may be determined to route the telephone call to a particular endpoint based on the voice biometric confidence score. For example, in step 615, the computing device may determine, based on the voice biometric confidence score, to route the telephone call to a certain endpoint. For instance, certain calls (which may, e.g., have voice biometric confidence scores within a certain range) may be determined to be potentially illegitimate and accordingly may be routed to specialized customer service representatives, as discussed in greater detail below.

In some embodiments, receiving a voice sample associated with a telephone call (e.g., in step 605) may include capturing one or more utterances that are responsive to prompts provided by an interactive voice response (IVR) system. For example, a caller's spoken responses to prompts provided by an IVR may be captured by the IVR system and/or obtained by the computing device for use as a voice sample in determining a voice biometric confidence score. In some instances, determining the voice biometric confidence score (e.g., in step 610) may thus include analyzing the one or more captured utterances.

In some embodiments, receiving a voice sample associated with a telephone call (e.g., in step 605) may include capturing one or more utterances that are responsive to prompts provided by a customer service representative. For example, a voice sample may, in some instances, be obtained while a caller or customer is speaking with another person, such as a customer service representative during an in-progress call, and the caller's responses to prompts provided by such a person may be captured by the telephone system and/or obtained by the computing device for use as a voice sample in determining a voice biometric confidence score. In some instances, determining the voice biometric confidence score (e.g., in step 610) may thus include analyzing such utterances.

In some instances, if and/or responsive to determining that the voice biometric confidence score falls below a certain threshold (e.g., during an in-progress call), determining to route the telephone call (e.g., in step 615) may include providing routing information to a customer service representative, where the routing information is configured to cause the customer service representative to transfer the telephone call to a specialized customer service representative for handling the in-progress call as a potentially illegitimate call. For example, if a caller is speaking with a generic customer service representative and, for instance, answering one or more authentication questions, but the voice biometric confidence score for the caller is falling and/or otherwise trending downward over the course of the call, the computing device may generate and provide such routing information to inform the customer service representative that the call should be transferred to a specialized associate who may have special training in handling potentially illegitimate calls. In other words, in analyzing voice biometrics during an in-progress voice call with a customer service representative, the computing device (e.g., system 200) may prompt the customer service representative to do a warm transfer of the call to a specialized customer service representative based on determining that the voice biometric confidence score is below a certain threshold and/or based on determining that the voice biometric confidence score has dropped by a predetermined amount beyond a threshold during the course of the call. Additionally or alternatively, one or more of these thresholds may be dynamically adjusted over time based on statistics and/or call metrics about voice biometric confidence scores for previously flagged calls that were later able to be authenticated and/or verified as being the actual customer and/or not an actually illegitimate call.

In some embodiments, based on and/or responsive to a telephone call being transferred to a specialized customer service representative (where, e.g., the voice biometric confidence score falls below a predetermined threshold as in the examples discussed above), it may be determined (e.g., by a computing device, such as system 200) to initiate recording and/or analysis of the telephone call. For example, if the computing device routes the call (or causes the call to be routed) to a specialized customer service representative for having a relatively low voice biometric confidence score, the computing device may begin recording and/or analyzing the caller's speech. The results of this analysis may, for instance, then be added to a database of potentially illegitimate callers, along with any additional information about the call, including historical information, such as the date of the call, the time of the call, the origin of the call, and/or other information. Additionally or alternatively, the computing device (e.g., system 200) may provide the specialized customer service representative with the ability to tag the call as illegitimate at any point, and such a tag may cause the recording to be saved and/or sampled to create a defensive voiceprint for use in identifying the illegitimate caller in the future. In addition, the specialized customer service representative may elicit the caller to say certain phrases and/or continue speaking in order to obtain an optimal voice sample for creating such a defensive voiceprint. Similarly, the computing device (e.g., system 200) may be configured to prompt the caller (e.g., via an IVR system) to say certain words and/or phrases for creating such a defensive voiceprint.

In some embodiments, the endpoint to which the computing device may determine to route the call may be a specialized customer service line that is configured to handle potentially illegitimate calls. For example, the specialized customer service line may be monitored and/or answered by one or more specialized customer service representatives and/or one or more specialized telephone systems, including one or more specialized IVR systems (which may, e.g., prompt the caller to answer one or more specially selected authentication questions for use in creating a defensive voiceprint). Additionally or alternatively, the specialized customer service line may be configured such that all calls are recorded and analyzed for future use in identifying potentially illegitimate calls.

Having discussed several examples of the processing that may be performed in handling calls based on a voice biometric confidence score in some embodiments, several user interfaces that may be displayed and/or otherwise provided will now be discussed in greater detail with respect to FIGS. 7 and 8. Any and/or all of the example user interfaces discussed herein may be displayed by a computing device, such as computing device 101 or system 200.

Figure 7:
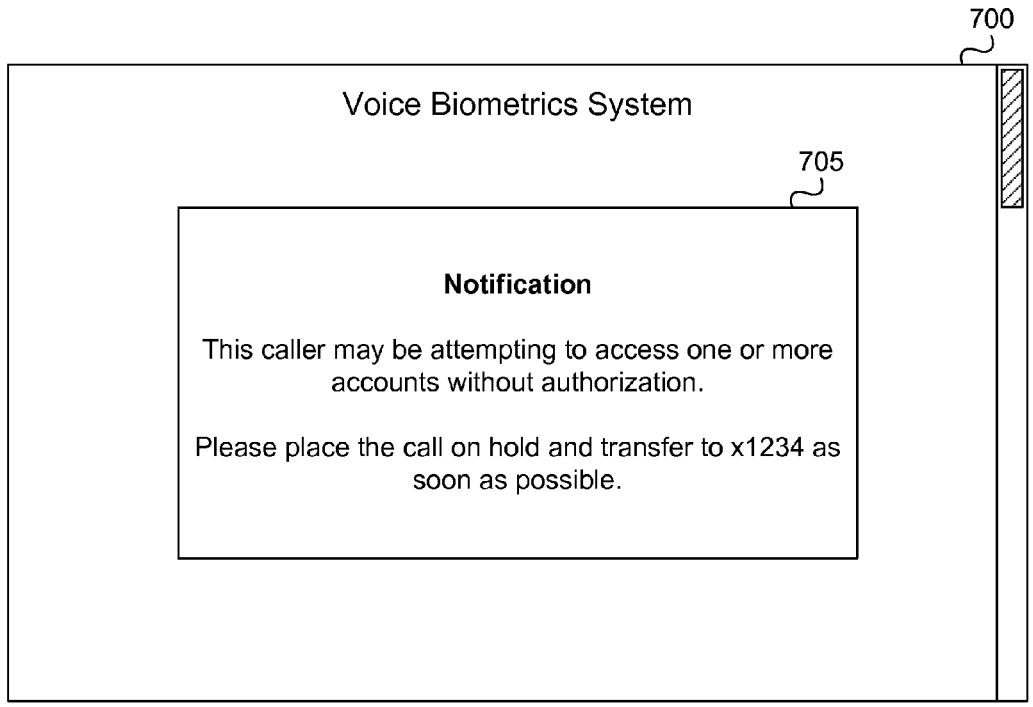
FIG. 7 illustrates an example user interface that may be displayed in routing a call to a specialized customer service representative according to one or more embodiments.

FIG. 7 illustrates an example user interface 700 that may be displayed in routing a call to a specialized customer service representative according to one or more embodiments. In particular, as seen in FIG. 7, user interface 700 may include a notification 705. Notification 705 may, for instance, be configured to alert a customer service representative as to the potentially illegitimate nature of the call (e.g., that the caller may be attempting to access one or more accounts without authorization). Additionally or alternatively, notification 705 may be configured to cause the customer service representative to transfer the call to a specialized customer service representative (e.g., by instructing the customer service representative to transfer the call to a particular line or extension).

Figure 8:
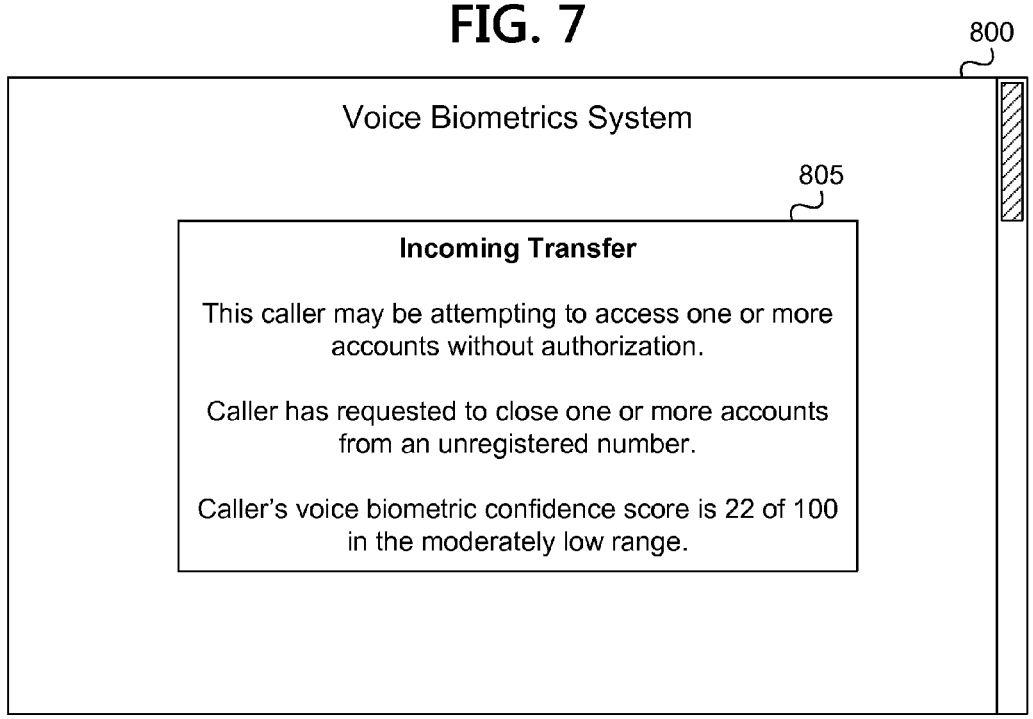
FIG. 8 illustrates an example user interface that may be displayed after a call is transferred according to one or more embodiments.

FIG. 8 illustrates an example user interface 800 that may be displayed after a call is transferred according to one or more embodiments. In particular, user interface 800 may be displayed to a specialized customer service representative as a potentially illegitimate call is being transferred in to such a representative. As seen in FIG. 8, user interface 800 may include a notification 805. Notification 805 may, for example, be configured to alert the specialized customer service representative that the caller may be attempting to access one or more accounts without authorization. In addition, notification 805 may be configured to include additional information about the nature of the call (e.g., indicating, in the illustrated example, that the caller has requested to close one or more accounts, yet is calling in from a telephone number that is not registered with the one or more accounts). Additionally, notification 805 may be configured to include information about the voice biometric confidence score for the caller (e.g., indicating, in the illustrated example, the calculated voice biometric confidence score for the caller and the relative range in which the voice biometric confidence score falls).

Figure 9:
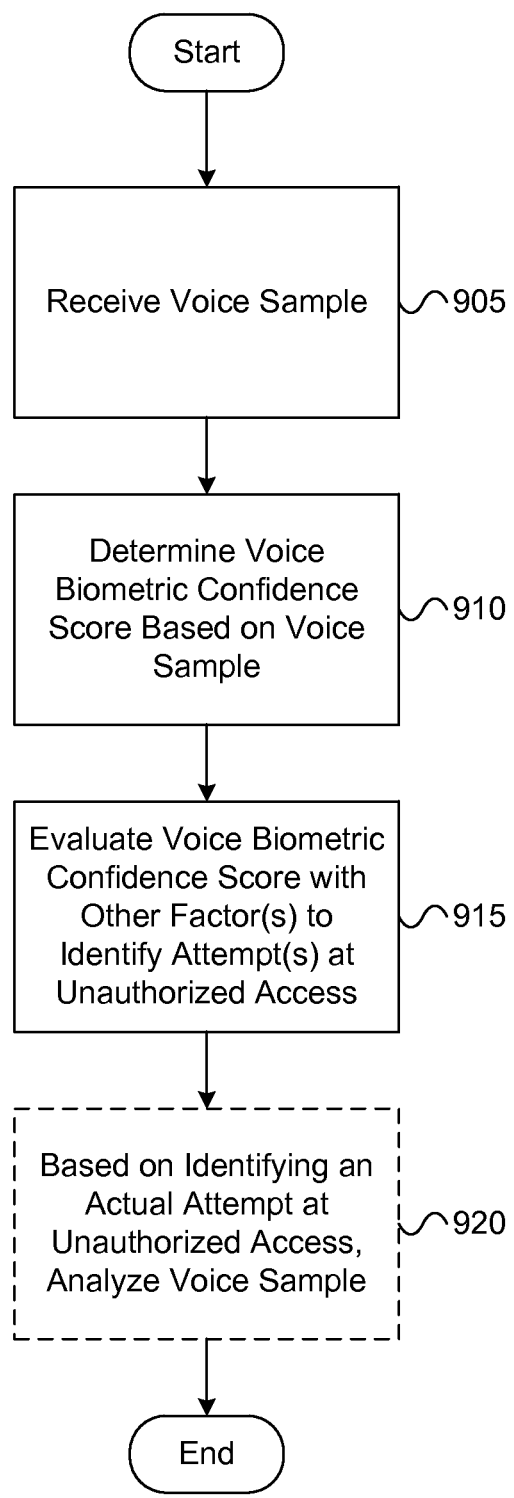
FIG. 9 illustrates a flowchart that depicts an example method of utilizing voice biometrics to prevent unauthorized access according to one or more embodiments.

FIG. 9 illustrates a flowchart that depicts an example method of utilizing voice biometrics to prevent unauthorized access according to one or more embodiments. In some embodiments, the method illustrated in FIG. 9 and/or one or more steps thereof may be performed by a computing device, such as computing device 101 and/or system 200. Additionally or alternatively, the method illustrated in FIG. 9 and/or one or more steps thereof may be embodied in computer-executable instructions that are stored in and/or configured to be stored in a computer-readable medium, such as a memory.

As seen in FIG. 9, the method may begin in step 905, in which a voice sample may be received. For example, in step 905, a computing device (e.g., computing device 101 or system 200) may receive a voice sample from one or more sources (e.g., similar to how a voice sample may be received in step 305 of the example method discussed above with respect to FIG. 3).

In step 910, a voice biometric confidence score may be determined based on the voice sample. For example, in step 910, the computing device may determine a voice biometric confidence score based on the voice sample received in step 905. Such a voice biometric confidence score may be determined based on the voice sample similar to how such a voice biometric confidence score may be determined in step 310 of the example method discussed above with respect to FIG. 3.

Continuing to refer to FIG. 9, in step 915, the voice biometric confidence score may be evaluated in combination with one or more other factors to identify an attempt to access an account without authorization. For example, the computing device may evaluate the voice biometric confidence score in combination with one or more of the phone type, phone number authenticity, call origin, phone number history, and call purpose, as discussed in greater detail below, so as to determine whether the caller or customer is attempting to access one or more accounts without authorization.

Subsequently, in step 920, based on and/or responsive to identifying an actual attempt at unauthorized access, the voice sample may optionally be analyzed. For example, in step 920, the computing device may analyze the voice sample and/or create, based on such analysis, a defensive voiceprint for use in identifying future attempts at unauthorized access by the caller or customer.

In some embodiments, the voice sample (which may, e.g., be referred to as "the first voice sample" in the discussion below) may be received (e.g., in step 905) via a first channel, and a second voice sample may be received via a second channel. The second voice sample may be different from the first voice sample, and the second channel may be different from the first channel. For example, the first channel may be a telephonic channel (e.g., the first voice sample may be received during a phone call from a telephonic system, such as an IVR system), and the second channel may be a mobile application channel (e.g., the second voice sample may be received as an audio sample from a software application being executed on a mobile device, and the software application may, for instance, be a mobile banking application). After the second voice sample is received, a second voice biometric confidence score may be determined based on the second voice sample (e.g., similar to how such a voice biometric confidence score may be determined in the examples discussed above). In addition, the second voice biometric confidence score may be evaluated in combination with the one or more other factors to identify a second attempt to access a second account without authorization.

In some instances, the first channel in the example above may be a first product channel of a financial institution, and the second channel may be a second product channel of the financial institution. In these instances, the techniques discussed above may be used in recognizing illegitimate usage and/or unauthorized access across multiple channels and/or entry points of the financial institution. For example, illegitimate usage and/or unauthorized access may be identified and/or prevented across different contact centers for card services, home loans and/or mortgage services, brokerage services, and/or other departments of the financial institution.

In some embodiments, the one or more other factors with which the voice biometric confidence score is evaluated may include the phone type, phone number authenticity, call origin, phone number history, and/or call purpose. The phone type factor may, for instance, refer to whether the phone being used by the caller is a landline, cellular phone, internet phone, or some other type of phone. The phone number authenticity factor may, for instance, refer to whether the phone number being used by the caller has been spoofed or not. The call origin factor may, for instance, refer to the city, state, and/or country from which the caller is calling. The phone number history factor may, for instance, refer to whether the phone number being used by the caller has been previously used in attempting to gain access to one or more accounts with or without authorization. The call purpose factor may, for instance, refer to the nature of the caller's one or more requests with respect to the one or more accounts (e.g., whether the caller is requesting to close one or more accounts, whether the caller is requesting to transfer funds to and/or from one or more accounts, and/or other types of requests).

As indicated above, in some embodiments, based on a determination that the voice sample is associated with an actual attempt to access an account without authorization, the voice sample may be analyzed and the analysis results may be stored in a database of suspicious voiceprints. In some arrangements, the database of suspicious voiceprints may be shared across and/or between various different organization and/or entities. For example, different financial institutions may contribute to and/or use data from such a database. Additionally or alternatively, other types of organizations may contribute to and/or use data from such a database.

In addition, in some embodiments, based on a determination that the voice sample is associated with an actual attempt to access an account without authorization, the account that the caller is attempting to access may be locked (e.g., so as to prevent any further transactions from being performed with respect to the account), and one or more legitimate users may be required to call in to unlock the account (e.g., so as to resume the ability to transact on the account). Additionally or alternatively, where the attempt to access the account without authorization originates from a mobile device and/or a software application being executed on the mobile device, the mobile device and/or the software application may be locked (e.g., until a legitimate user calls in and/or otherwise authenticates to unlock the mobile device and/or the software application).

In some embodiments, evaluating the voice biometric confidence score in combination with one or more other factors may include assigning a weight to the voice biometric confidence score and assigning one or more additional weights to the one or more other factors. Thereafter, one or more of these weights may be dynamically adjusted based on call metrics. For example, the computing device (e.g., system 200) may dynamically adjust one or more of the weights assigned to various factors based on statistics and/or call metrics about voice biometric confidence scores and/or other data for previously flagged calls and/or voice samples that were later able to be authenticated and/or verified as being the actual customer and not an actual attempt at unauthorized access.

Having discussed several examples of the processing that may be performed in utilizing voice biometrics to prevent unauthorized access in some embodiments, several user interfaces that may be displayed and/or otherwise provided will now be discussed in greater detail with respect to FIGS. 10 and 11. Any and/or all of the example user interfaces discussed herein may be displayed by a computing device, such as computing device 101 or system 200.

Figure 10:
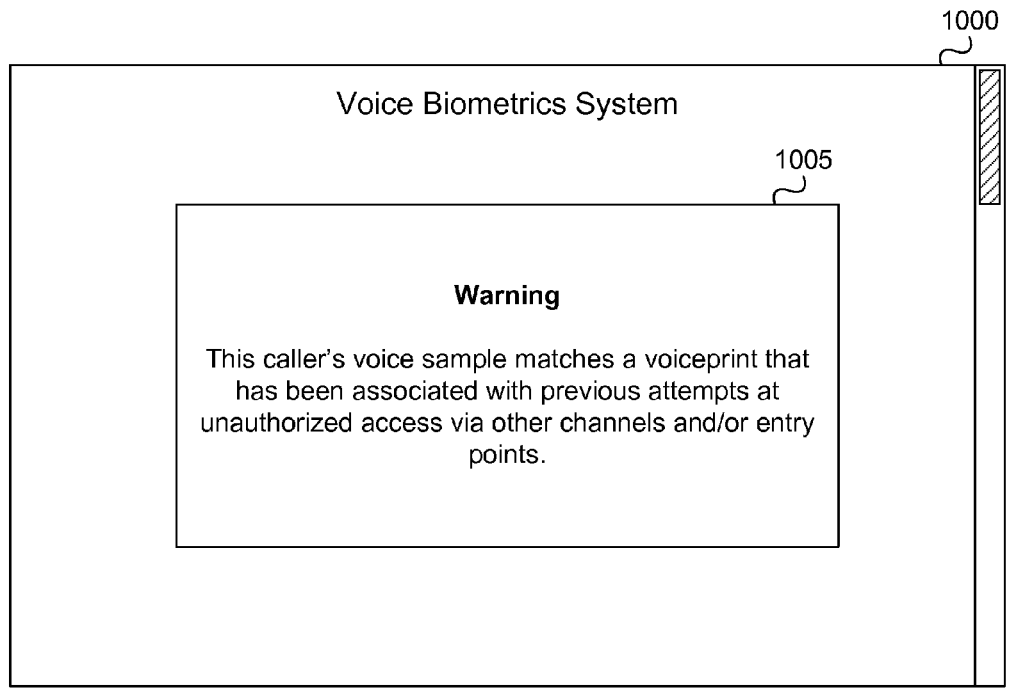
FIG. 10 illustrates an example user interface that may be displayed after an attempt to access an account without authorization has been identified.

FIG. 10 illustrates an example user interface 1000 that may be displayed after an attempt to access an account without authorization has been identified. In particular, as seen in FIG. 10, after an attempt to access an account without authorization has been identified, a notification 1005 may be displayed in user interface 1000. Notification 1005 may, for example, be configured to inform a customer service representative and/or other user who may be interacting with user interface 1000 that the caller or customer may be attempting to access one or more accounts without authorization (e.g., by indicating, as in the illustrated example, that the caller's voice sample matches a voiceprint that has been associated with previous attempts at unauthorized access via other channels and/or entry points of the organization).

Figure 11:
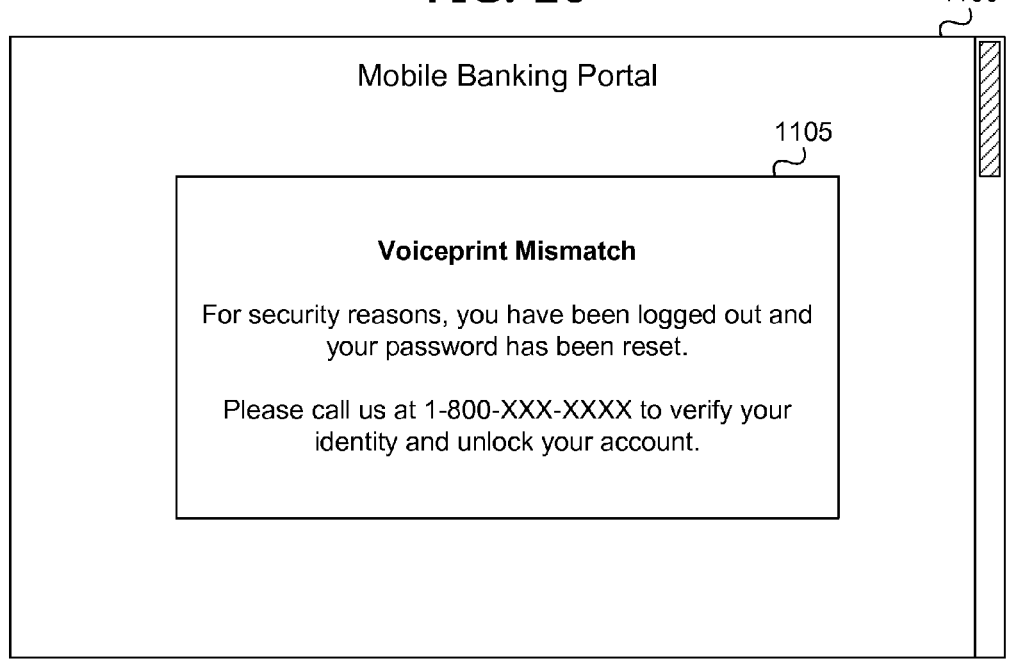
FIG. 11 illustrates another example user interface that may be displayed after an attempt to access an account without authorization has been identified.

FIG. 11 illustrates another example user interface 1100 that may be displayed after an attempt to access an account without authorization has been identified. In one or more arrangements, user interface 1100 may be displayed on a mobile device, for instance, after a user of the mobile device attempts to access one or more accounts without authorization (e.g., using a software application being executed on the mobile device, such as a mobile banking application). As seen in FIG. 11, user interface 1100 may include a notification 1105 that may be configured to inform the user that collected voice biometrics (e.g., the voice sample received in step 905 of the example method discussed above) do not match and/or that one or more accounts have been locked accordingly. For instance, as in the illustrated example, notification 1105 may inform the user of a voiceprint mismatch, indicate that the user account has been logged out and/or that the account password has been reset, and/or indicate that the user must call in and/or otherwise contact the organization to verify his or her identity and/or unlock the one or more locked accounts.

Figure 12:
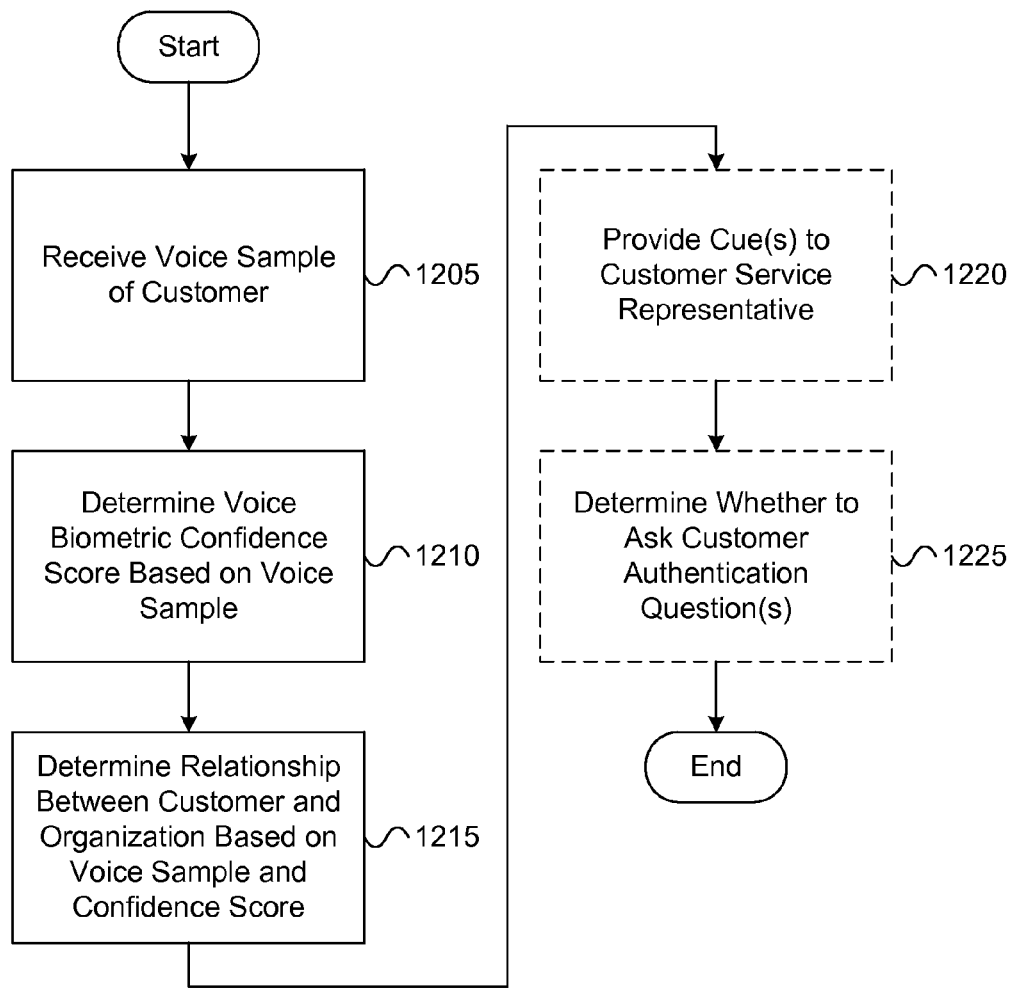
FIG. 12 illustrates a flowchart that depicts an example method of utilizing voice biometrics to provide relationship-based service according to one or more embodiments.

FIG. 12 illustrates a flowchart that depicts an example method of utilizing voice biometrics to provide relationship-based service according to one or more embodiments. In some embodiments, the method illustrated in FIG. 12 and/or one or more steps thereof may be performed by a computing device, such as computing device 101 or system 200. Additionally or alternatively, the method illustrated in FIG. 12 and/or one or more steps thereof may be embodied in computer-executable instructions that are stored in and/or configured to be stored in a computer-readable medium, such as a memory.

As seen in FIG. 12, the method may begin in step 1205, in which a voice sample associated with a customer of an organization may be received. For example, in step 1205, a computing device (e.g., computing device 101 or system 200) may receive a voice sample from one or more sources (e.g., similar to how such a voice sample may be received in step 305 of the example method discussed above with respect to FIG. 3), where the voice sample is of a customer of an organization speaking one or more words and/or phrases.

In step 1210, a voice biometric confidence score may be determined based on the voice sample. For example, in step 1210, the computing device may determine a voice biometric confidence score based on the voice sample received in step 1205. Such a voice biometric confidence score may be determined based on the voice sample similar to how such a voice biometric confidence score may be determined in step 310 of the example method discussed above with respect to FIG. 3.

In step 1215, a relationship between the customer and the organization may be determined based on the voice sample and/or based on the voice biometric confidence score. For example, in step 1215, the computing device may determine the relationship between the customer and the organization, for instance, as illustrated in the examples discussed below.

In step 1220, one or more cues may optionally be provided to a customer service representative. For example, in step 1220, the computing device may provide (and/or may cause to be provided) one or more cues to a customer service representative based on the relationship determined in step 1215, for instance, as illustrated in the examples discussed below.

In step 1225, it may optionally be determined whether to ask the customer one or more authentication questions. For example, in step 1225, the computing device may determine whether to ask the customer one or more authentication questions, for instance, as illustrated in the examples discussed below. Additionally or alternatively, if the computing device determines to ask the customer one or more authentication questions (e.g., in step 1225), the computing device may select one or more authentication questions and/or cause such authentication questions to be asked of the customer (e.g., as discussed above with respect to the example method illustrated in FIG. 3).

In some instances, in determining the relationship between the customer and the organization (e.g., in step 1215), the customer may be identified based solely on their voice sample (e.g., the voice sample received in step 1205) if the voice biometric confidence score is high enough and/or exceeds a predetermined threshold. Additionally or alternatively, if the voice biometric confidence score is below a certain threshold, the customer may be asked to provide additional identifying information, such as their name and/or account number, and/or may be asked one or more authentication questions.

By performing one or more steps of the example method illustrated in FIG. 12, the relationship between the customer and the organization may be determined and/or identified based on the customer's voiceprint. Moreover, such a relationship may be determined, identified, and/or considered without regard to the particular products and/or accounts that the customer is contacting the organization about. Indeed, by utilizing this relationship-based service model, the customer may be approached based on their relationship to the organization (which may, e.g., be a financial institution), rather than through the lens of a particular account or product that the customer has, wants, and/or is contacting the organization about. For example, a customer's voice sample may be used as authentication credentials across various and/or all channels of an organization, such as a financial institution, regardless of which account the customer may be trying to access. Some examples of these channels may include a credit card account management IVR system, a checking account management IVR system, a brokerage account management IVR system, an ATM, and/or in-person banking. Additionally or alternatively, the customer may be assigned a unique relationship identifier that may be used in identifying the customer and identifying the one or more accounts that are linked to and/or owned by the customer.

In some embodiments, determining the relationship between the customer and the organization (e.g., in step 1215) may include retrieving information associated with at least one of the customer's name, address, accounts, products (which may, e.g., include information about the services and/or goods that the customer uses and/or purchases from the organization), local retail location (which may, e.g., include information about the retail location that is nearest to the customer's home address), physical visit history (which may, e.g., include information about the customer's previous visits to retail locations operated by the organization), and online usage history (which may, e.g., include information about the customer's previous usage of one or more websites and/or applications provided by the organization).

As indicated above, in some embodiments, one or more cues may be provided to a customer service representative based on the voice biometric confidence score. Such cues may, for example, include background information about the customer (e.g., the customer's name and/or address) and/or predictive information for the customer, such as information about the customer's predicted needs and/or interests, one or more targeted offers, and/or other information that is specific to and/or selected for the customer. In some instances, the voice biometric confidence score may additionally or alternatively be used in determining whether to personally engage with the customer regarding his or her more detailed physical visit history information and/or online usage history information.

In some instances, the voice sample received in step 1205 may be received via a telephone call (e.g., as in other examples discussed above). In other instances, the voice sample received in step 1205 may be received via a microphone installed at a retail location (e.g., as in other examples discussed above). Where a voice sample is obtained from such a microphone, a customer may, for instance, be identified at a banking center or at an ATM. In still other instances, the voice sample received in step 1205 may be received via a mobile application (e.g., as in other examples discussed above). In some arrangements where the voice sample is received via a microphone (e.g., during an in-person interaction between the customer and a bank teller or other employee, during an interaction between the customer and an ATM machine, and/or the like), the voice sample may be received in combination with an image and/or video of the customer that may, for instance, be captured using a camera or other image capture device that is installed at the same location (or substantially near) as the microphone. In these instances, the image and/or video of the customer may be used in combination with the voice sample to identify and/or authenticate the customer. For example, if the image of the customer matches an image on record of the customer, the biometric confidence score may be increased, whereas if the image of the customer does not closely match the image on record of the customer, the biometric confidence score may be decreased. In some instances, where a voice biometric identification is confirmed and/or enhanced by an image biometric analysis, the computing device (e.g., system 200) may set one or more reliability flags, which may enable the customer to have more complete access to transact on one or more accounts than might otherwise be granted without such reliability flags being set.

As indicated above, in some embodiments, it may be determined, based on the voice biometric confidence score, whether to ask the customer one or more authentication questions. For example, if the voice biometric confidence score determined in step 1210 is relatively low, the computing device may determine to select and/or ask one or more authentication questions of the customer (e.g., as in other examples discussed above, such as those discussed with respect to FIG. 3).

In some embodiments, one or more data records used by and/or otherwise associated with the organization may be stored and/or maintained at the relationship level (e.g., rather than at the account level). In addition, such data records may be shared within and/or accessible to all departments and/or lines of business within the organization. For example, the organization may deploy consistent data records at an enterprise level across the entire organization, and customer data may be stored as and/or retrievable by a name and/or identifier in association with a particular voiceprint. Additionally, information about the particular products and/or accounts that are used by and/or held by a particular customer may be stored in one or more sub-fields of such a data structure.

Having discussed several examples of the processing that may be performed in utilizing voice biometrics to provide relationship-based service in some embodiments, an example user interface that may be displayed and/or otherwise provided, as well as an example data structure that may be utilized, will now be discussed in greater detail with respect to FIGS. 13 and 14.

Figure 13:
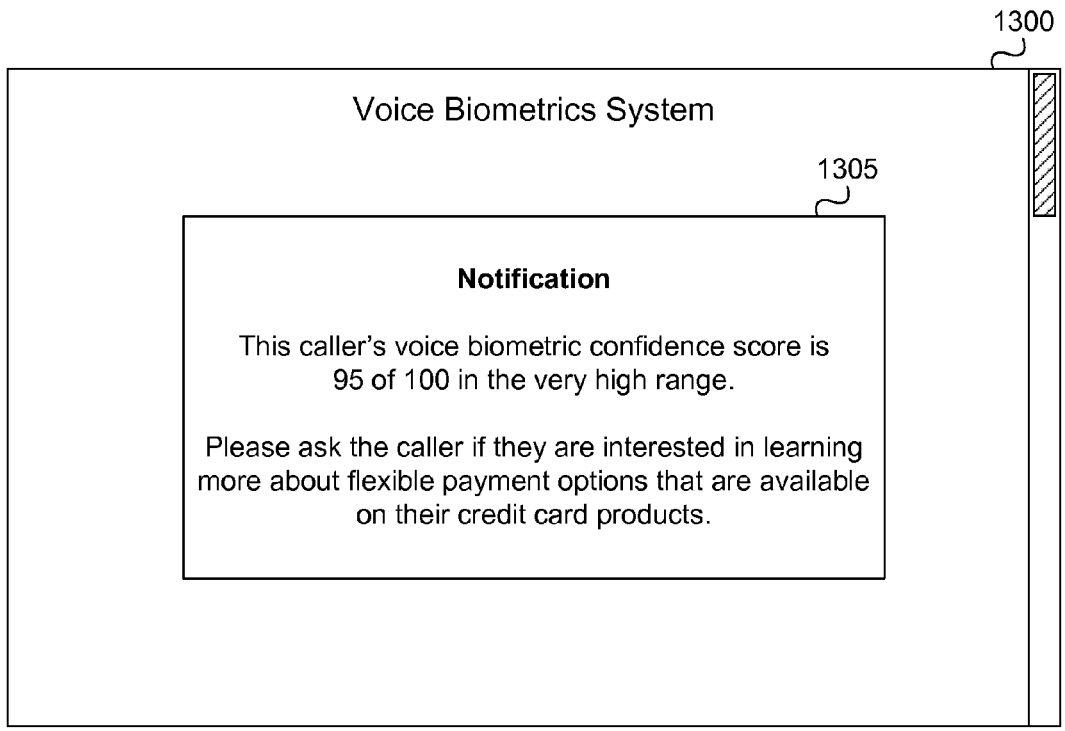
FIG. 13 illustrates an example user interface for providing one or more cues to a customer service representative according to one or more embodiments.

FIG. 13 illustrates an example user interface 1300 for providing one or more cues to a customer service representative according to one or more embodiments. The example user interface 1300 shown in FIG. 13 may, for example, be displayed by a computing device, such as computing device 101 or system 200, in one or more arrangements. As seen in FIG. 13, user interface 1300 may include a notification 1305. Notification 1305 may, for example, be configured to provide one or more cues to a customer service representative, for instance, after a caller or customer has been identified using voice biometrics. In the example illustrated in FIG. 13, for instance, notification 1305 may include information indicating that the caller's voice biometric score is relatively high and/or additional information that is configured to cue the customer service representative to ask the caller about selected offers, goods, and/or services.

Figure 14:
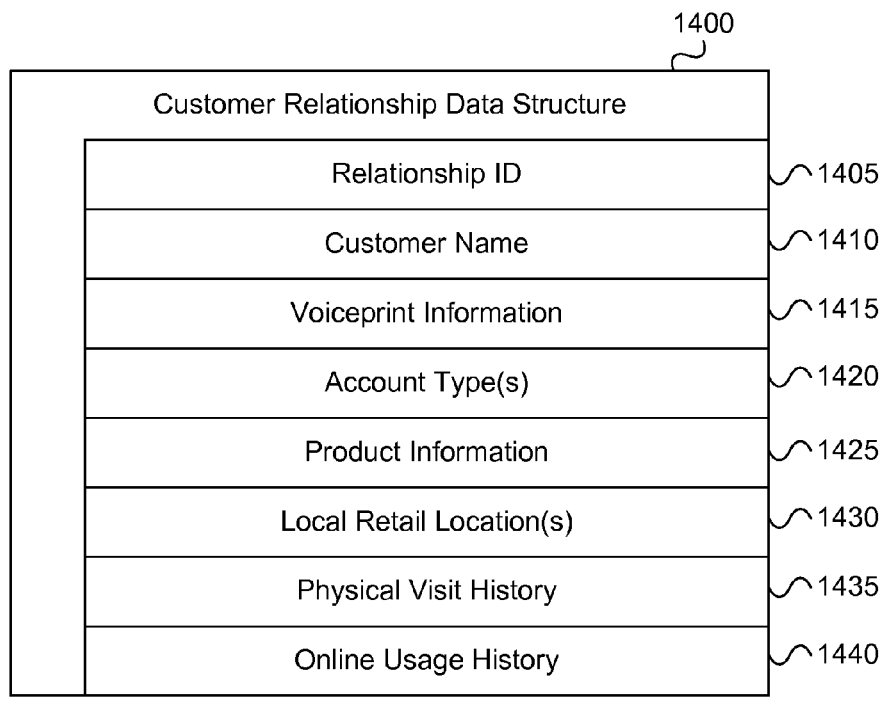
FIG. 14 illustrates an example data structure that may be used in providing relationship-based service according to one or more embodiments.

FIG. 14 illustrates an example data structure 1400 that may be used in providing relationship-based service according to one or more embodiments. In particular, data structure 1400 may be used by an organization, such as a financial institution, to store information about various customers in association with one or more voiceprints for such customers. In addition, such a data structure may be used by the organization to approach customers at the relationship level, rather than at the product level.

As seen in FIG. 14, data structure 1400 may include one or more fields and/or sub-fields in which different types of information may be stored. While the example illustrated in FIG. 14 includes particular numbers and/or types of fields, other numbers and/or types of fields may similarly be included in a data structure in addition to and/or instead of those illustrated in FIG. 14 in other embodiments. In the illustrated example, data structure 1400 may include a relationship identifier field 1405, a customer name field 1410, a voiceprint information field 1415, an account types field 1420, a product information field 1425, a local retail locations field 1430, a physical visit history field 1435, and an online usage history field 1440.

In one or more arrangements, relationship identifier field 1405 may include a unique identifier assigned to the relationship between the particular customer and the organization. Customer name field 1410 may, for instance, include the first, middle, and/or last name of the customer. Additionally or alternatively, customer name field 1410 also may include other identifying information for the customer, such as the customer's home and/or work addresses, the customer's phone number(s), the customer's email address(es), the customer's username(s), and/or the like. Voiceprint information field 1415 may, for example, include one or more voiceprints for the customer that can be used in connection with various voice biometrics functionalities, such as those discussed above. Account types field 1420 may, for instance, include information about the various accounts that the customer has with the organization and/or with other organizations. Product information field 1430 may, for example, include information about the one or more products that the customer has, one or more products that the customer has expressed interest in, and/or one or more products that the customer may be interested in (e.g., as determined based on one or more predictive algorithms). Local retail locations field 1430 may, for example, include information one or more retail locations that are physically near the customer, including the customer's home, place of work, and/or current location. Physical visit history field 1435 may, for instance, include information about the customer's previous visits to one or more retail locations, including the date and/or time of such visits, the particular locations visited, and/or the like. Online usage history field 1440 may, for example, include information about the customer's previous usage of computing resources provided by the organization, such as the customer's website usage, mobile application usage, and/or the like.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computing device, comprising:
   at least one processor; and
   memory storing computer readable instructions that, when executed by the at least one processor, cause the computing device to:
      receive a voice sample associated with a telephone call, wherein receiving the voice sample associated with the telephone call comprises capturing one or more utterances that are responsive to prompts provided by a customer service representative during an in-progress call;
      determine a voice biometric confidence score based on the voice sample;
      determine to route the telephone call to a first endpoint based on the voice biometric confidence score, wherein determining to route the telephone call to the first endpoint based on the voice biometric confidence score comprises:
         based on the voice biometric confidence score falling below a threshold during the in-progress call, providing routing information to the customer service representative, the routing information being configured to cause the customer service representative to transfer the telephone call to a specialized customer service representative for handling as a potentially illegitimate call; and
      based on the telephone call being transferred to the specialized customer service representative, determine to initiate recording and analysis of the telephone call, wherein a recording of the telephone call is saved and sampled to create a defensive voiceprint for identifying a caller associated with the telephone call as an illegitimate caller.

2. The computing device of claim 1, wherein receiving the voice sample associated with the telephone call further comprises capturing one or more additional utterances that are responsive to prompts provided by an interactive voice response (IVR) system.

3. The computing device of claim 2, wherein determining the voice biometric confidence score comprises analyzing the one or more additional captured utterances.

4. The computing device of claim 1, wherein the first endpoint is a specialized customer service line that is configured to handle potentially illegitimate calls.

5. A method, comprising:
receiving, by a computing device, a voice sample associated with a telephone call, wherein receiving the voice sample associated with the telephone call comprises capturing one or more utterances that are responsive to prompts provided by a customer service representative during an in-progress call;
determining, by the computing device, a voice biometric confidence score based on the voice sample;
determining, by the computing device, to route the telephone call to a first endpoint based on the voice biometric confidence score, wherein determining to route the telephone call to the first endpoint based on the voice biometric confidence score comprises:
based on the voice biometric confidence score falling below a threshold during the in-progress call, providing routing information to the customer service representative, the routing information being configured to cause the customer service representative to transfer the telephone call to a specialized customer service representative for handling as a potentially illegitimate call; and
based on the telephone call being transferred to the specialized customer service representative, determining, by the computing device, to initiate recording and analysis of the telephone call, wherein a recording of the telephone call is saved and sampled to create a defensive voiceprint for identifying a caller associated with the telephone call as an illegitimate caller.

6. The method of claim 5, wherein receiving the voice sample associated with the telephone call further comprises capturing one or more additional utterances that are responsive to prompts provided by an interactive voice response (IVR) system.

7. The method of claim 6, wherein determining the voice biometric confidence score comprises analyzing the one or more additional captured utterances.

8. The method of claim 5, wherein the first endpoint is a specialized customer service line that is configured to handle potentially illegitimate calls.

9. The method of claim 5, wherein the threshold is dynamically adjusted over time based on call metrics information associated with a plurality of voice biometric confidence scores for a plurality of previously flagged calls.

10. The method of claim 5, wherein determining the voice biometric confidence score based on the voice sample comprises:
selecting a voiceprint for authenticating a caller associated with the telephone call from at least one database based on input provided by the caller, the input comprising one or more of a username or an account number; and
using the selected voiceprint in analyzing the voice sample to determine the voice biometric confidence score.

11. The method of claim 5,
wherein the routing information is presented to the customer service representative via a first notification, and
wherein the computing device is configured to cause a second notification to be presented to the specialized customer service representative, the second notification comprising information indicating that a caller associated with the telephone call is attempting to access one or more accounts and information identifying the voice biometric confidence score for the caller.

12. One or more non-transitory computer-readable media having computer-executable instructions stored thereon that, when executed by a computing device, cause the computing device to:
receive a voice sample associated with a telephone call, wherein receiving the voice sample associated with the telephone call comprises capturing one or more utterances that are responsive to prompts provided by a customer service representative during an in-progress call;
determine a voice biometric confidence score based on the voice sample;
determine to route the telephone call to a first endpoint based on the voice biometric confidence score, wherein determining to route the telephone call to the first endpoint based on the voice biometric confidence score comprises:
based on the voice biometric confidence score falling below a threshold during the in-progress call, providing routing information to the customer service representative, the routing information being configured to cause the customer service representative to transfer the telephone call to a specialized customer service representative for handling as a potentially illegitimate call; and
based on the telephone call being transferred to the specialized customer service representative, determine to initiate recording and analysis of the telephone call, wherein a recording of the telephone call is saved and sampled to create a defensive voiceprint for identifying a caller associated with the telephone call as an illegitimate caller.

13. The one or more non-transitory computer-readable media of claim 12, wherein receiving the voice sample associated with the telephone call further comprises capturing one or more additional utterances that are responsive to prompts provided by an interactive voice response (IVR) system.

14. The one or more non-transitory computer-readable media of claim 13, wherein determining the voice biometric confidence score comprises analyzing the one or more additional captured utterances.

15. The one or more non-transitory computer-readable media of claim 12, wherein the first endpoint is a specialized customer service line that is configured to handle potentially illegitimate calls.

* * * * *